US011144982B1

(12) United States Patent
Raak et al.

(10) Patent No.: US 11,144,982 B1
(45) Date of Patent: Oct. 12, 2021

(54) SYSTEM FOR RECOMMENDING A MEAL KIT BASED UPON USE-BY DATES AND RELATED METHODS

(71) Applicant: INMAR CLEARING, INC., Winston-Salem, NC (US)

(72) Inventors: Alise Raak, Winston-Salem, NC (US); Diana Medina, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 231 days.

(21) Appl. No.: 16/406,496

(22) Filed: May 8, 2019

(51) Int. Cl.
| | |
|---|---|
| *G06Q 30/00* | (2012.01) |
| *G06Q 30/06* | (2012.01) |
| *G06Q 30/02* | (2012.01) |
| *G06F 16/908* | (2019.01) |
| *G06F 16/9032* | (2019.01) |

(52) U.S. Cl.
CPC ....... *G06Q 30/0631* (2013.01); *G06F 16/908* (2019.01); *G06F 16/90324* (2019.01); *G06Q 30/0223* (2013.01); *G06Q 30/0224* (2013.01); *G06Q 30/0239* (2013.01)

(58) Field of Classification Search
None
See application file for complete search history.

(56) References Cited

U.S. PATENT DOCUMENTS

| | | | |
|---|---|---|---|
| 6,513,017 B1 | 1/2003 | Howard et al. | |
| 7,063,263 B2 | 6/2006 | Swartz et al. | |
| 7,797,204 B2 | 9/2010 | Balent | |
| 10,460,464 B1 * | 10/2019 | Hasan | G06K 9/00624 |
| 2004/0054634 A1 | 3/2004 | Tak | |
| 2013/0138656 A1 | 5/2013 | Wheaton | |
| 2013/0166366 A1 | 6/2013 | Allen | |
| 2013/0339163 A1 | 12/2013 | Dumontet et al. | |
| 2015/0356665 A1 * | 12/2015 | Colson | G06Q 30/0635 705/26.81 |
| 2016/0358121 A1 | 12/2016 | Knobel | |
| 2019/0053332 A1 * | 2/2019 | Cheng | H05B 6/668 |
| 2019/0122286 A1 * | 4/2019 | Lang | G06Q 30/0217 |
| 2019/0130378 A1 * | 5/2019 | Miyata | G06Q 20/209 |
| 2019/0243922 A1 * | 8/2019 | Pinel | G06F 16/24522 |
| 2019/0272557 A1 * | 9/2019 | Smith | G06F 17/18 |
| 2019/0290172 A1 * | 9/2019 | Hadad | A61B 5/0022 |
| 2021/0182933 A1 * | 6/2021 | Subramanian | G06Q 30/0625 |

OTHER PUBLICATIONS

Raak et al., U.S. Appl. No. 16/406,524, filed May 8, 2019.
(Continued)

*Primary Examiner* — Naeem U Haq
(74) *Attorney, Agent, or Firm* — Allen, Dyer, Doppelt + Gilchrist, P.A.

(57) ABSTRACT

A system for recommending a meal kit may include a user device and a meal kit recommendation server. The meal kit recommendation server may be configured to store use-by dates for respective food items and generate a recommended meal kit based upon the use-by dates. The meal kit recommendation server may also be configured to generate a digital promotion for the recommended meal kit and communicate the recommended meal kit and the digital promotion to the user device.

14 Claims, 13 Drawing Sheets

(56) References Cited

OTHER PUBLICATIONS

Platejoy—Your Partner in Personal Nutrition, "Healthy Eating for Busy People," Plate Joy, https://www.platejoy.com/, retrieved Jun. 1, 2021, pp. 1-7.

Grunow et al, RFID in Highly Perishable Food Supply Chains—Remaining Shelf Life to Supplant Expiry Date, International Journal of Production Economics, vol. 146, Issue 2, 2013, pp. 717-727.

* cited by examiner

SYSTEM FOR RECOMMENDING A MEAL KIT BASED UPON USE-BY DATES AND RELATED METHODS

TECHNICAL FIELD

The present invention relates to the field of food item processing, and more particularly meal kit processing and related methods.

BACKGROUND

Many food items have an associated use-by date. For example, many food items have a best-by date which may be considered only advisory and refer to the date at which the quality of the product diminishes, for example, loses freshness or flavor. Some food items have a sell-by date, which may often be related to a latest date at which the food product may be sold for purposes of safe consumption.

A meal kit may include pre-portioned food ingredients and a corresponding recipe. A meal kit may be available online, for example, through a subscription service, or through an e-commerce portal of a brick-and-mortar grocery store. A meal kit may also be available in the brick-and-mortar grocery store.

U.S. Patent Application Publication No. 2013/0138656 to Wheaton discloses a food inventory system that enables food inventory control as well as meal planning. Food inventory data and meal recipes are stored in a database. Meal planning is enabled whereby recipes are proposed based on inventory levels and/or food expiration or spoilage times, as well as nutrient and dietary information. Shopping lists are created that reflect inventory levels, recipe needs, and/or food expiration or spoilage dates. Meal planning also enables a plurality of meals to be planned by creating recipes for a given meal count such that expiring or spoiling inventory ingredients are used in the order of which ingredients will expire or spoil first. The user can order the meals or items online from a grocery store. U.S. Pat. No. 7,063,263 to Swartz et al. discloses providing a promotion on a product that may be overstocked or near expiration at a grocery store.

SUMMARY

A system for recommending a meal kit may include a user device and a meal kit recommendation server. The meal kit recommendation server may be configured to store use-by dates for respective food items and generate a recommended meal kit based upon the use-by dates. The meal kit recommendation server may also be configured to generate a digital promotion for the recommended meal kit and communicate the recommended meal kit and the digital promotion to the user device.

The meal kit recommendation server may be configured to obtain a food item purchase history associated with a given user, and generate the recommended meal kit based upon the food item purchase history, for example. The recommended meal kit may include a plurality of pre-portioned food ingredients and a corresponding recipe.

The meal kit recommendation server may be configured to store a quantity of each of the plurality of food items, and generate the recommended meal kit based upon the respective quantities. The digital promotion may have a promotional value associated therewith, and the meal kit recommendation server may be configured to generate the digital promotion to have the promotional value based upon the respective quantities, for example.

The digital promotion may have a promotional value associated therewith, and the meal kit recommendation server may be configured to generate the digital promotion to have the promotional value based upon the respective use-by dates, for example. The plurality of food items may be for a plurality of store locations, and the meal kit recommendation server may be configured to generate the recommended meal kit based upon the respective use-by dates at a given one of the plurality of store locations.

A method aspect is directed to a method of recommending a meal kit. The method may include using a meal kit recommendation server to store a plurality of use-by dates for respective food items and generate a recommended meal kit based upon the use-by dates. The method may also include using the meal kit recommendation server to generate a digital promotion for the recommended meal kit and communicate the recommended meal kit and the digital promotion to a user device.

A computer readable medium aspect is directed to a non-transitory computer readable medium for recommending a meal kit. The non-transitory computer readable medium may include computer executable instructions that when executed by a processor cause the processor to perform operations. The operations may include storing a plurality of use-by dates for respective food items and generating a recommended meal kit based upon the use-by dates. The operations may also include generating a digital promotion for the recommended meal kit and communicating the recommended meal kit and the digital promotion to a user device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
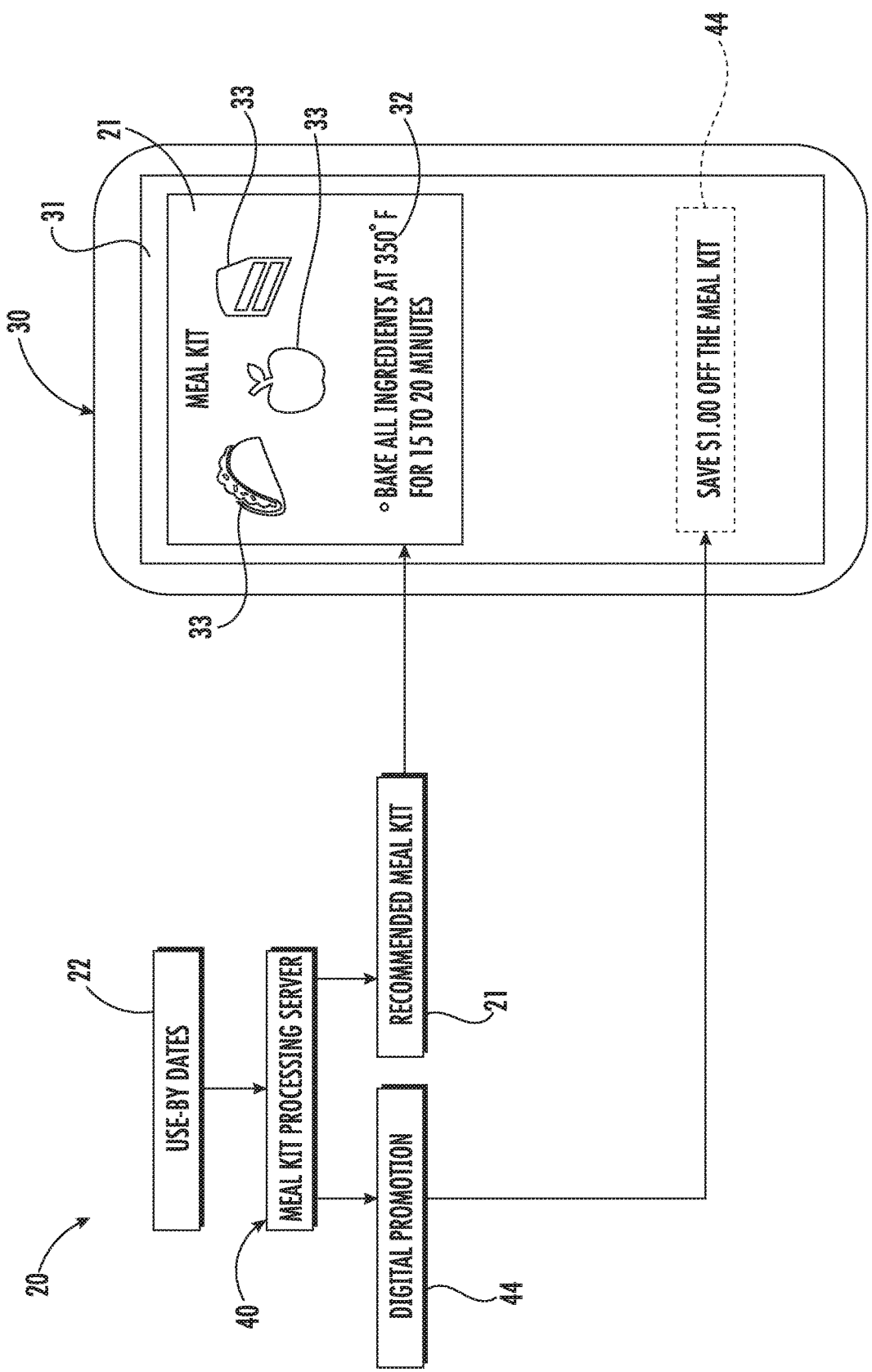
FIG. 1 is a schematic diagram of a system for recommending a meal kit in accordance with an embodiment.
Figure 2:
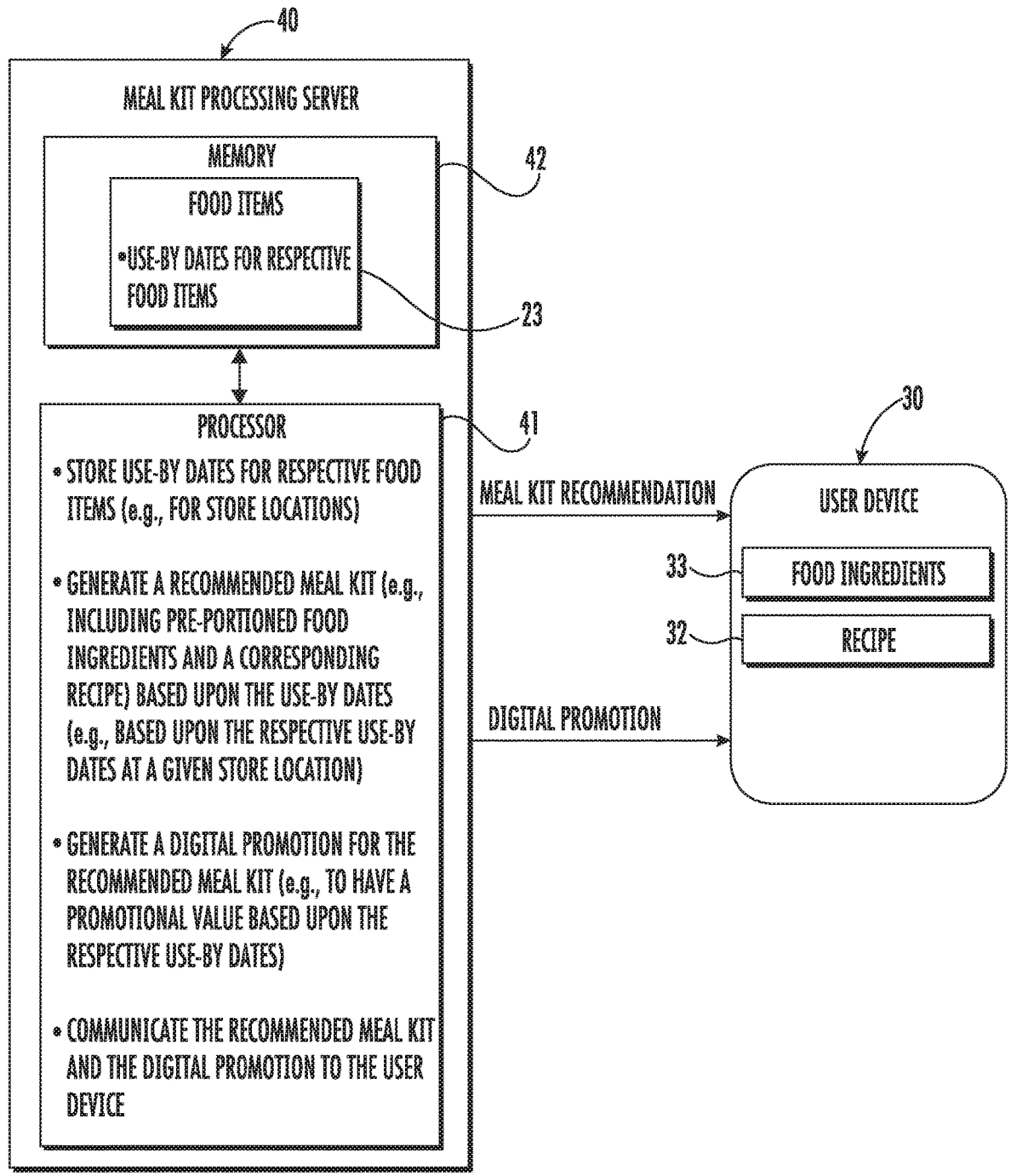
FIG. 2 is a schematic block diagram of the system for recommending a meal kit of FIG. 1.

Referring initially to FIGS. 1 and 2, a system 20 for recommending a meal kit 21 includes a user device 30 and a meal kit recommendation server 40. The user device 30 may be a tablet computer, personal computer, mobile device, wearable device, digital virtual assistant (e.g., voice based digital virtual assistant) or any other wired or wireless electronic device associated with the user. The user device 30 includes a display 31.

The meal kit recommendation server 40 includes a processor 41 and a memory 42 coupled to the processor. While operations of the meal kit recommendation server 40 are described herein, it should be understood that the processor 41 and the memory 42 cooperate to perform the described operations.

Figure 3:
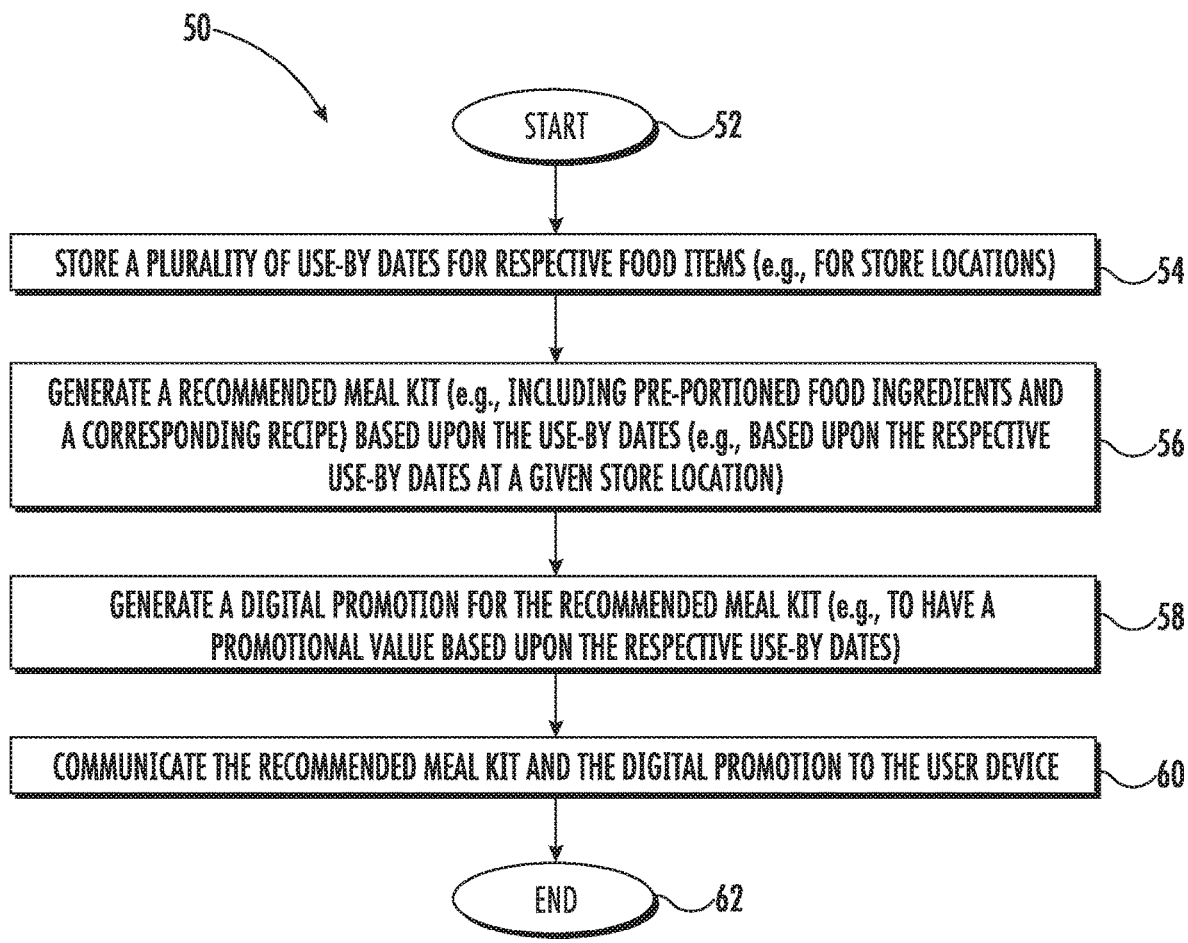
FIG. 3 is a flow chart illustrating operation of the meal kit recommendation server in accordance with an embodiment.

Referring now additionally to the flowchart 50 in FIG. 3, beginning at Block 52, operations of the meal kit recommendation server 40 will now be described. At Block 54, the meal kit recommendation server 40 stores use-by dates 22 for respective food items 23, for example, in the memory 42. Those skilled in the art will appreciate that a use-by date 22 may be any of a best-by or best-before date, a guaranteed freshness date, or a sell-by date.

The meal kit recommendation server 40, at Block 56, generates a recommended meal kit 21 based upon the use-by dates 22. More particularly, the meal kit recommendation server 40 may determine food items 23 within a threshold time period from the use-by date. Food items 23 having a use-by date 22 within the threshold time period may serve the basis for generating the recommended meal kit 21.

Those skilled in the art will appreciate that a meal kit 21 may include pre-portioned food ingredients 33 and a corresponding recipe 32. Of course, while the meal kit recommendation server 40 generates a recommended meal kit 21, the meal kit recommendation server may alternatively or additionally generate a recommended recipe 32 based the use-by dates 22.

In some embodiments, the food items 23 may be for multiple store locations, for example. Where the food items 23 are for multiple store locations, the meal kit recommendation server 40 generates the recommended meal kit 21 based upon the respective use-by dates 22 at a given one of the store locations. In other words, the meal kit recommendation server 40 may determine the recommended meal kit 21 for a given store location (e.g., so that all elements of the recommended meal kit are sourced from the same store location). The meal kit recommendation server 40 may select the given store location for the recommended meal kit 21 based upon the user's location (e.g., the determined geographic location of the user device 30), or user-input (e.g., a user's preferred store location). The meal kit recommendation server 40 may select the given store based upon other and/or additional inputs.

The meal kit recommendation server 40 generates a digital promotion 44 for the recommended meal kit (Block 58). Those skilled in the art will understand that the digital promotion 44 may be in the form of a digital coupon, a digital rebate, or another form of digital promotion. The digital promotion 44 has a promotional value associated therewith, for example, in the form of a percentage or dollar amount off the purchase price of the recommended meal kit 21. In embodiments where the meal kit recommendation server 40 generates the recommended meal kit 21 based upon the respective use-by dates 22 at a given store location, the digital promotion 44 may be redeemable at the given store location. The promotional value of the digital promotion 44 may be greater the further away the given user is from the given store location.

In some embodiments, the meal kit recommendation server 40 generates the digital promotion 44 to have a promotional value that is based upon the respective use-by dates 22. For example, the digital promotion 44 may have a lower promotional value the farther away from the use-by date 22 and a higher promotional value the closer to the use-by date. The meal kit recommendation server 40 may generate the promotional offer 44 to have promotional value determined by additional factors.

At Block 60, the meal kit recommendation server 40 communicates the recommended meal kit 21 and the digital promotion 44 to the user device 30. For example, the meal kit recommendation server 40 may wirelessly communicate the recommended meal kit 21 and digital promotion 44 to the user device 30 for display on the display 31. The recommended meal kit 21 may be displayed as an image on the display 31. Similarly, the digital promotion 44 may be displayed on the display 31 and may be saved to a digital wallet associated with a given user for future redemption online or at a point-of-sale (POS) terminal, for example. In some embodiments where the user device 30 is in the form of a digital virtual assistant (e.g., voice based), the user device may audibly speak content of the digital promotion 44 and/or the recommended meal kit 21. Operations end at Block 62.

Figure 4:
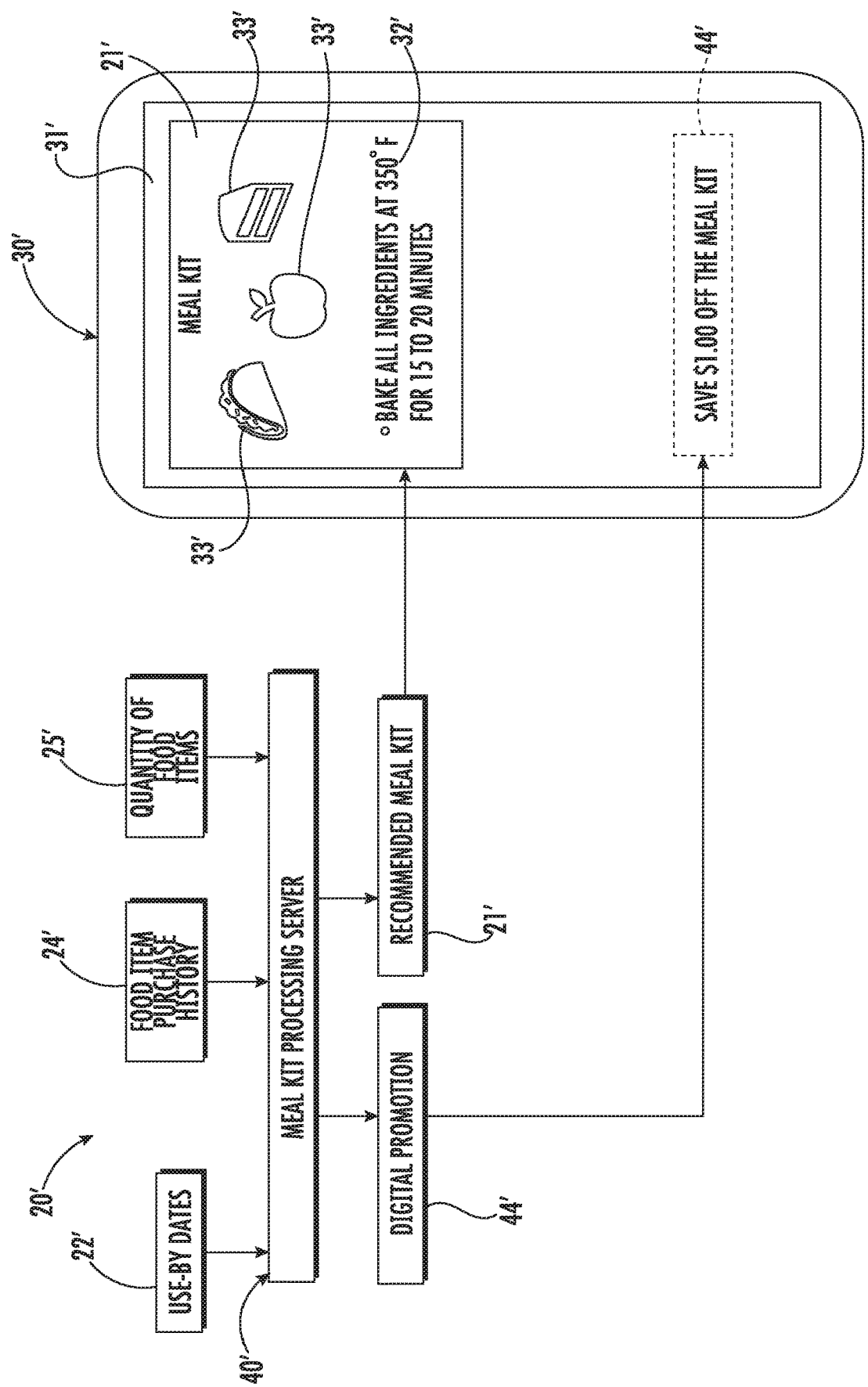
FIG. 4 is a schematic diagram of a system for recommending a meal kit in accordance with an embodiment.
Figure 5:
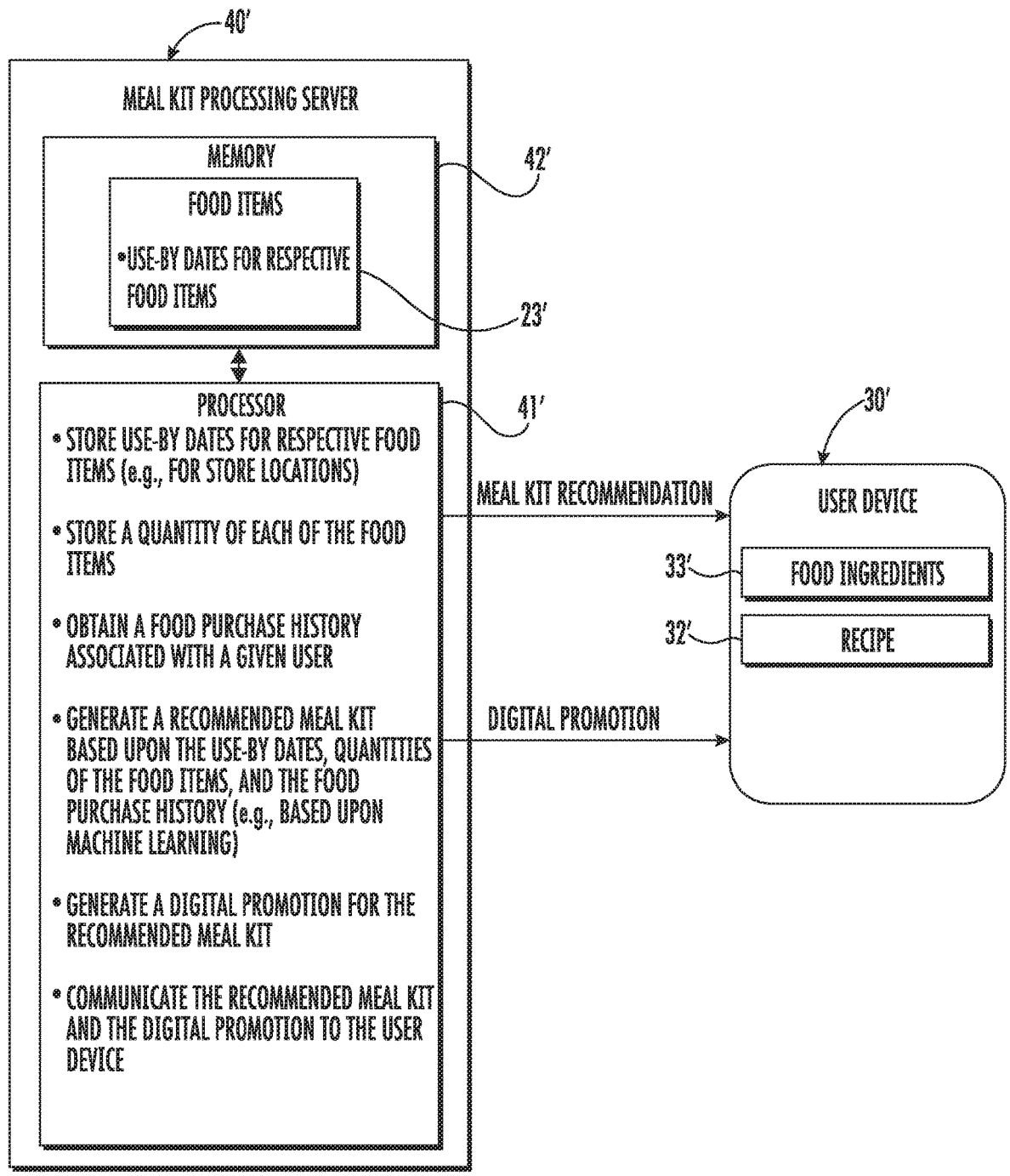
FIG. 5 is a schematic block diagram of the system for recommending a meal kit of FIG. 4.
Figure 6:
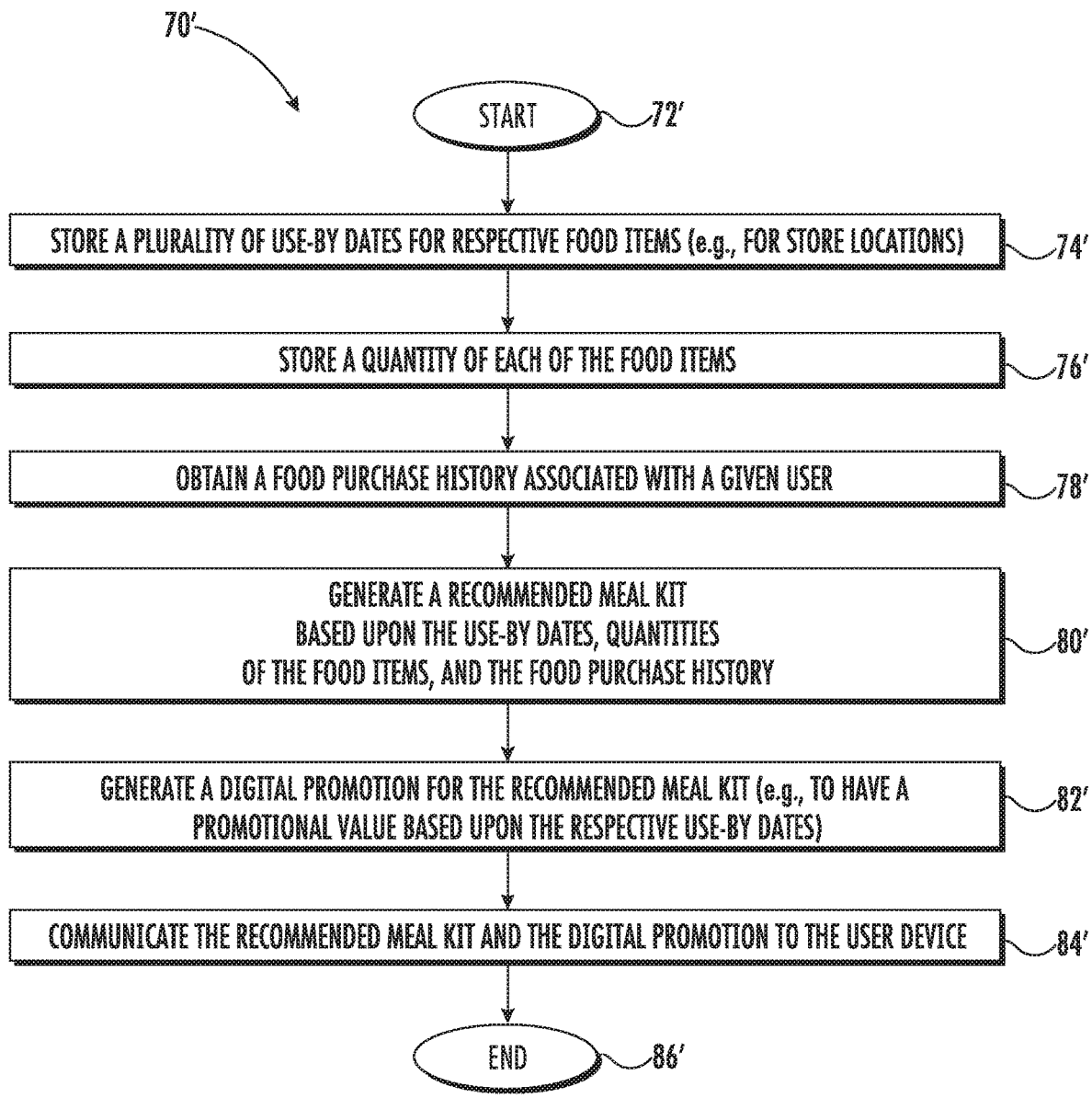
FIG. 6 is a flow chart illustrating operation of the meal kit recommendation server in accordance with an embodiment.

Referring now to FIGS. 4 and 5, and the, flowchart 70' in FIG. 6, beginning at Block 72', in another embodiment, the meal kit recommendation server 40' may generate the recommended meal kit based upon additional factors. Similar to the embodiments described above, the meal kit recommendation server 40', at Block 74', stores use-by dates 22' for respective food items 23'. The meal kit recommendation server 40' also stores a quantity of each of the food items 25' (Block 76'). At Block 78', the meal kit recommendation server 40' obtains a food item purchase history 24' associated with a given user. The given user may be associated with the user device 30', for example. The corresponding food item purchase history 24' may be obtained based upon a user identifier, for example, a loyalty account number, phone number, email address, etc. The user identifier may be obtained by way of input to the user device 30', for example. The food item purchase history 24' or user identifier may be obtained by other techniques, as will be appreciated by those skilled in the art.

At Block 80', the meal processing server 40' generates a recommended meal kit 21'. The recommended meal kit 21' is generated based upon the use-by dates 22', the quantity of the food items 25', and the food item purchase history 24' associated with the given user. For example, a given meal kit may include food items or pre-portioned food ingredients 33' that may be relatively close to the use-by date 22', that the given location has a relatively high quantity of relative to the use-by date, and that have been previously purchased by the given user. In other words, the recommended meal kit 21' may include food items 33' that the given user likes based upon the food item purchase history 24' and are thus likely to purchase again. The recommended meal kit 21' may include food items 33' that are similar to other food items in the food item purchase history 24', and/or may be devoid of food items not in the food item purchase history. The meal kit recommendation server 40' may use machine learning to determine the recommended meal kit 21', for example, based upon a training a model with the use-by dates 22', the quantities 25', and the food item purchase history 24'. Store-level purchase data of previously recommended meal kits, for example, that may include the same food items may also be used to train the model or serve as the basis for generating the recommended meal kit.

At Block 82' the meal kit recommendation server 40' generates a digital promotion 44' for the recommended meal kit 21'. The meal kit recommendation server 40' generates the digital promotion 44' to have the promotional value also based on the quantity 25' in addition to the use-by dates 22'. In some embodiments, the meal kit recommendation server 40' generates the digital promotion 44' to have the promotional value also based upon food item purchase history 24'. Other operations or aspects of generating the digital promotion 44' are similar to the embodiments described above. At Block 84', the meal kit recommendation server 40' communicates the recommended meal kit 21' including the pre-portioned food ingredients 33' and the associated recipe 32', and the digital promotion 44' to the user device 30'. The communication of the recommended meal kit 21' and the digital promotion 44' are similar to the communication described in the above embodiments. Operations end at Block 86'.

A method aspect is directed to a method of processing a meal kit 21. The method includes using a meal kit recommendation server 40 to store a plurality of use-by dates 22 for respective food items 23 and generate a recommended meal kit 21 based upon the use-by dates. The method also includes using the meal kit recommendation server 40 to generate a digital promotion 44 for the recommended meal kit 21 and communicate the recommended meal kit and the digital promotion to a user device 30.

A computer readable medium aspect is directed to a non-transitory computer readable medium for processing a meal kit 21. The non-transitory computer readable medium includes computer executable instructions that when executed by a processor 41 cause the processor to perform operations. The operations include storing a plurality of use-by dates 22 for respective food items 23 and generating a recommended meal kit 21 based upon the use-by dates. The operations also include generating a digital promotion 44 for the recommended meal kit 21 and communicating the recommended meal kit and the digital promotion to a user device 30.

Figure 7:
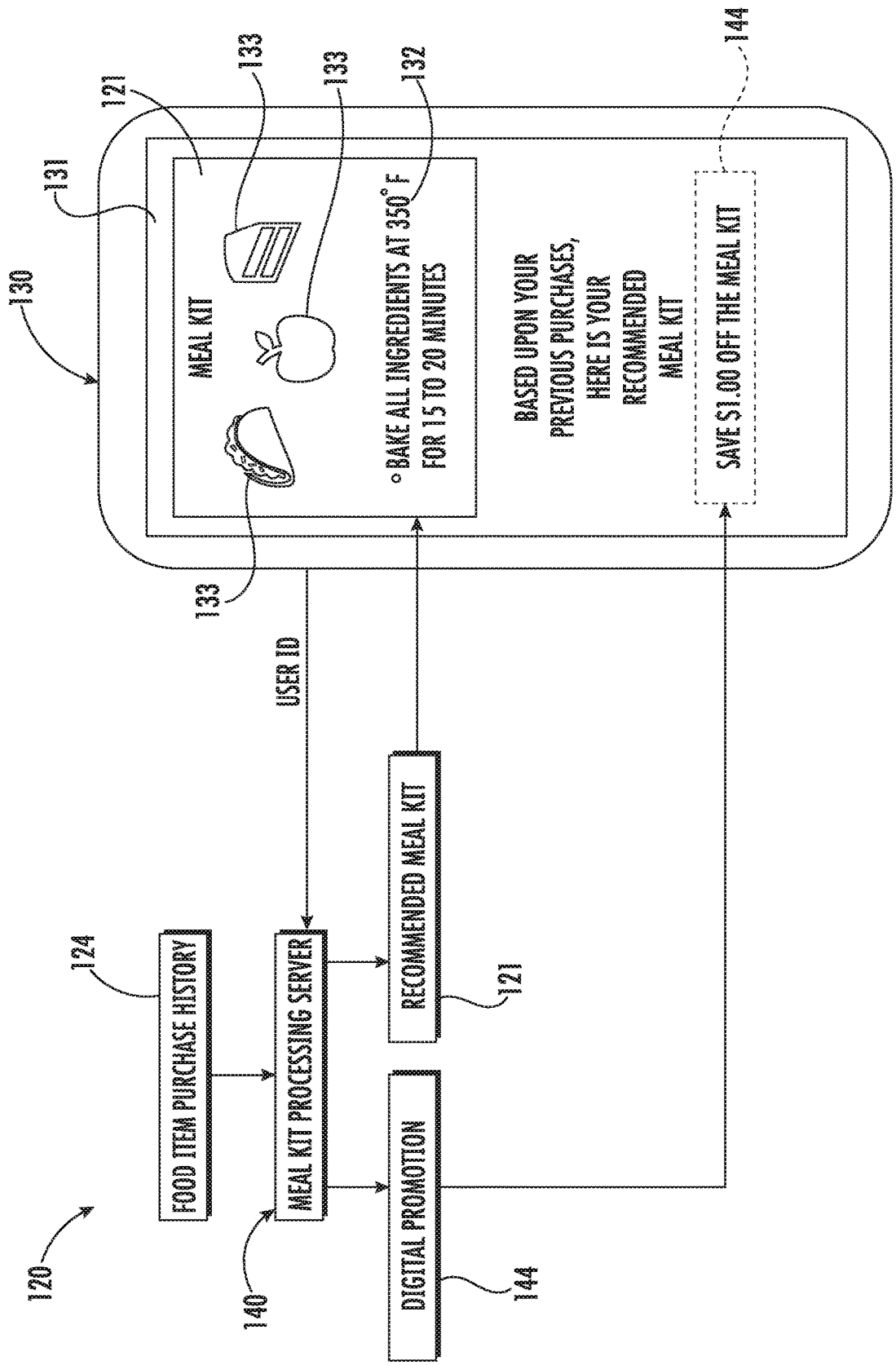
FIG. 7 is a schematic diagram of a system for recommending a meal kit in accordance with an embodiment.
Figure 8:
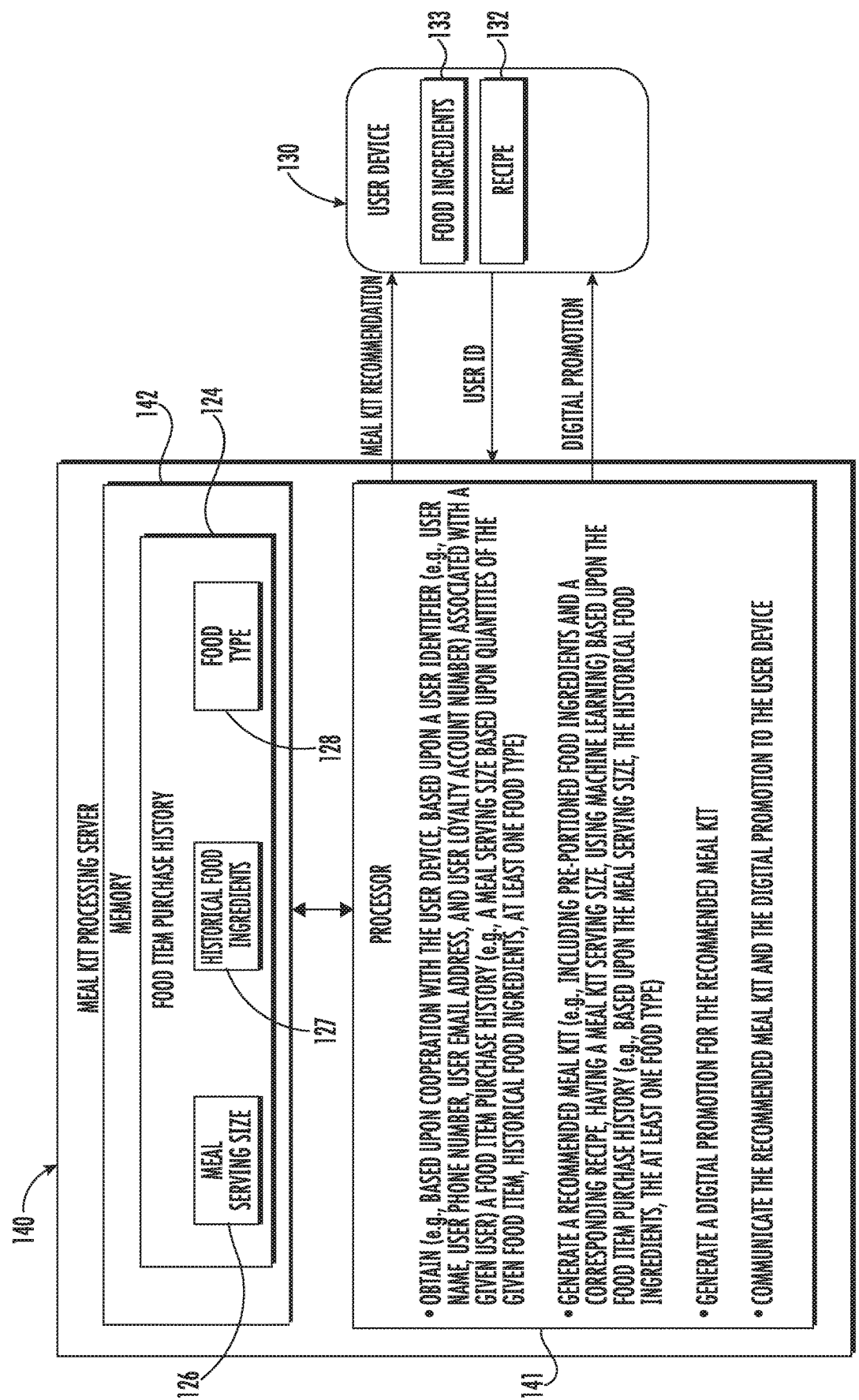
FIG. 8 is a schematic block diagram of the system for recommending a meal kit of FIG. 7.

Referring now to FIGS. 7 and 8, in another embodiment a system 120 for recommending a meal kit 121 includes a user device 130 and a meal kit recommendation server 140. The user device 130 may be a tablet computer, personal computer, mobile device, wearable device, or any other wired or wireless electronic device associated with the user. The user device 130 includes a display 131.

The meal kit recommendation server 140 includes a processor 141 and a memory 142 coupled to the processor. While operations of the meal kit recommendation server 140 are described herein, it should be understood that the processor 141 and the memory 142 cooperate to perform the described operations.

Figure 9:
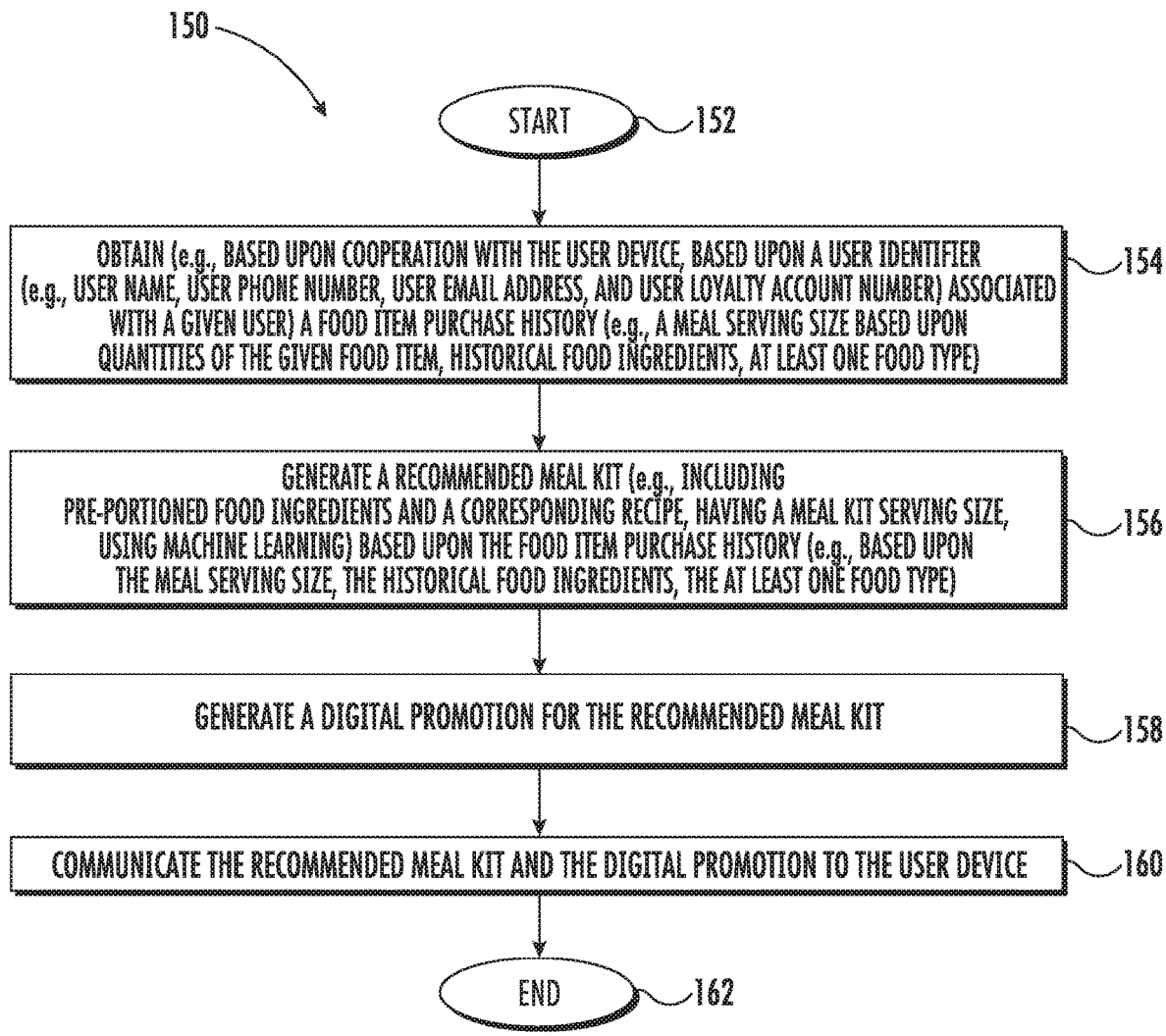
FIG. 9 is a flow chart illustrating operation of the meal kit recommendation server in accordance with an embodiment.

Referring now additionally to the flowchart 150 in FIG. 9, beginning at Block 152, operations of the meal kit recommendation server 140 will now be described. At Block 154, the meal kit recommendation server 140 obtains a food item purchase history 124 associated with a given user, for example, based upon a user identifier associated with the given user. Historical food ingredients 127 may be determined based upon the food item purchase history 124 (e.g., specific foods, such as, chicken, asparagus, white bread, etc.). The given user may be associated with the user device 130, for example, and the corresponding food item purchase history 124 may obtained based upon cooperation between the user device and the meal kit processing server 140. The user identifier may include, for example, a user name, a user phone number, a user email address, and/or a user loyalty account number. As will be appreciated by those skilled in the art, the user identifier may be obtained by way of input to the user device 130, for example. The food item purchase history 124 or user identifier may be obtained by other techniques.

The meal kit recommendation server 140, at Block 156, generates a recommended meal kit 121 based upon the food item purchase history 124. More particularly, those skilled in the art will appreciate that a meal kit 121 may include pre-portioned food ingredients 133 and a corresponding recipe 132. Of course, while the meal kit recommendation server 140 generates a recommended meal kit 121, the meal kit recommendation server may alternatively or additionally generate a recommended recipe 132 based upon the food item purchase history 124.

The meal kit recommendation server 140 may determine and generate the recommended meal kit 121, and more particularly, the pre-portioned food ingredients 133, based upon the determined historical food ingredients 127 of the food item purchase history 124, for example. In other words, the recommended meal kit 121 may include specific pre-portioned food ingredients 133 that correspond to historical food ingredients 127 associated with the given user. For example, the meal kit recommendation server 140 may generate the recommended meal kit 121 to include chicken, asparagus, and/or certain spices.

The meal kit recommendation server 140 may use machine learning to generate the recommended meal kit 121, for example. More particularly, the meal kit recommendation server 140 may use the food item purchase history 124 as an input to a training model. The meal kit recommendation server 140 may also train a model (either the same model or different models) to determine other characteristics used for making the meal kit recommendation, as will be described in further detail below. The meal kit recommendation server 140 may determine a meal serving size 126 based upon quantities of a given food item 125 from the food purchase history 124 and generate the recommended meal kit 121 based upon the meal serving size. For example, a given user or purchaser may historically purchase, on a weekly basis, food quantities that are indicative of or correspond to a family size (e.g., a family of four with small children buys or consumes two gallons of milk each week). In other words, the meal kit recommendation server 140 may learn (e.g., by training a model), from the timing between purchases and quantities of food items 125 purchased in each food order, the amount of food included in or the meal serving size of the recommended meal kit 121. With respect to the milk example above, based upon a determined family size of four, the meal kit recommendation server 140 may recommend a meal kit that has a serving size that corresponds to the family of four.

The meal kit recommendation server 140 may also determine one or more food types 128 based upon the food item purchase history 124. A food type 128 may include a food item with a dietary characteristic, for example, low/no fat, gluten free, whole wheat, lactose free, low sodium, etc. A food type 128 may include a family of food types, for example, vegetable, seafood, meat. Of course, a food type 128 may include other and/or additional food type characteristics. The meal kit recommendation server 140 may thus generate the recommended meal kit 121 based upon the determined food type from the food item purchase history 124. For example, if the food item purchase history 124 is determined to lack any types of meat including seafood, the meal kit recommendation server 124 may recommend the meal kit include pre-portioned food items 133 or ingredients that may be considered vegetables or fruits. In another example, if children are determined to be in the family (e.g., determined by the type of food items in the food item purchase history 124), the meal kit recommendation server 140 may recommend more "child friendly" food items 133 for the recommended meal kit 121 (e.g., chicken nuggets, pizzas, etc.).

The meal kit recommendation server 140 generates a digital promotion 144 for the recommended meal kit 121 (Block 158). Those skilled in the art will understand that the digital promotion 144 may be in the form of a digital coupon, a digital rebate, or another form of digital promotion. The digital promotion 144 has a promotional value associated therewith, for example, in the form of a percentage or dollar amount off the purchase price of the recommended meal kit 121.

At Block 160, the meal kit recommendation server 140 communicates the recommended meal kit 121 and the digital promotion 144 to the user device 130. For example, the meal kit recommendation server 140 may wirelessly communicate the recommended meal kit and digital promotion 144 to the user device 130 for display on the display 131. The recommended meal kit 121 may be displayed as an image on the display 131. Similarly, the digital promotion 144 may be displayed on the display 131 and may be saved to a digital wallet associated with a given user for future redemption online or at POS terminal, for example. Operations end at Block 162.

Figure 10:
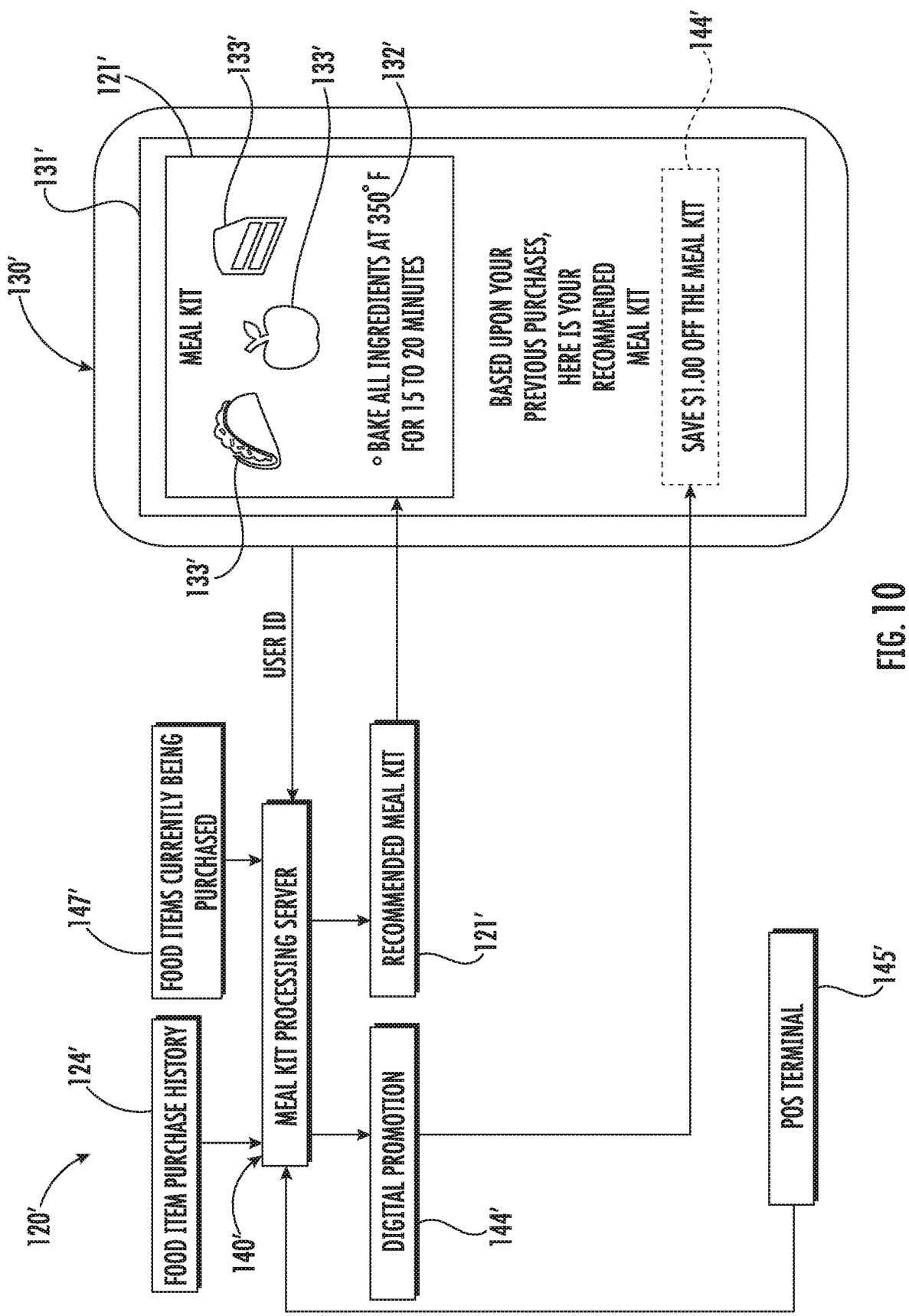
FIG. 10 is a schematic diagram of a system for recommending a meal kit in accordance with an embodiment.
Figure 11:
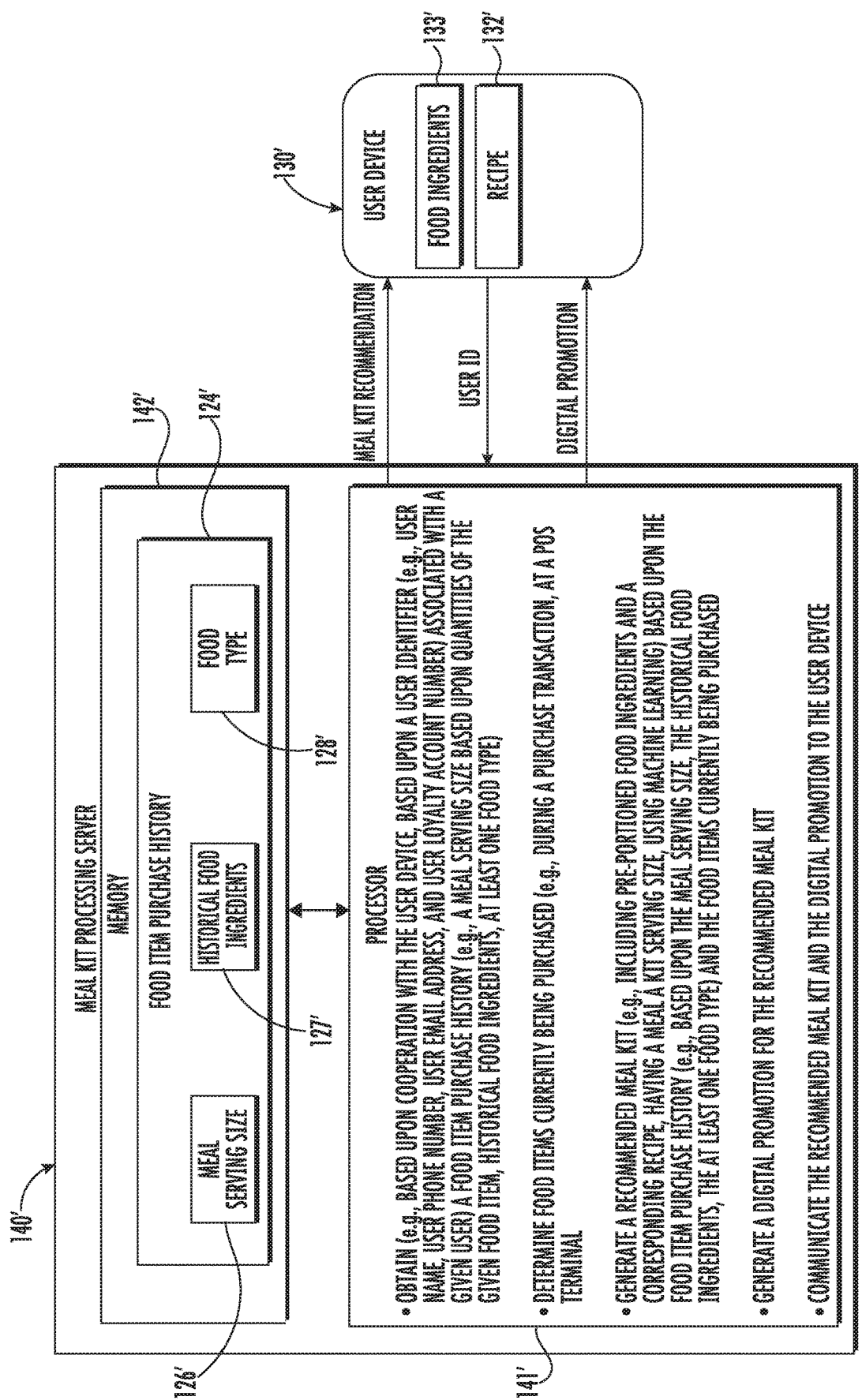
FIG. 11 is a schematic block diagram of the system for recommending a meal kit of FIG. 10.
Figure 12:
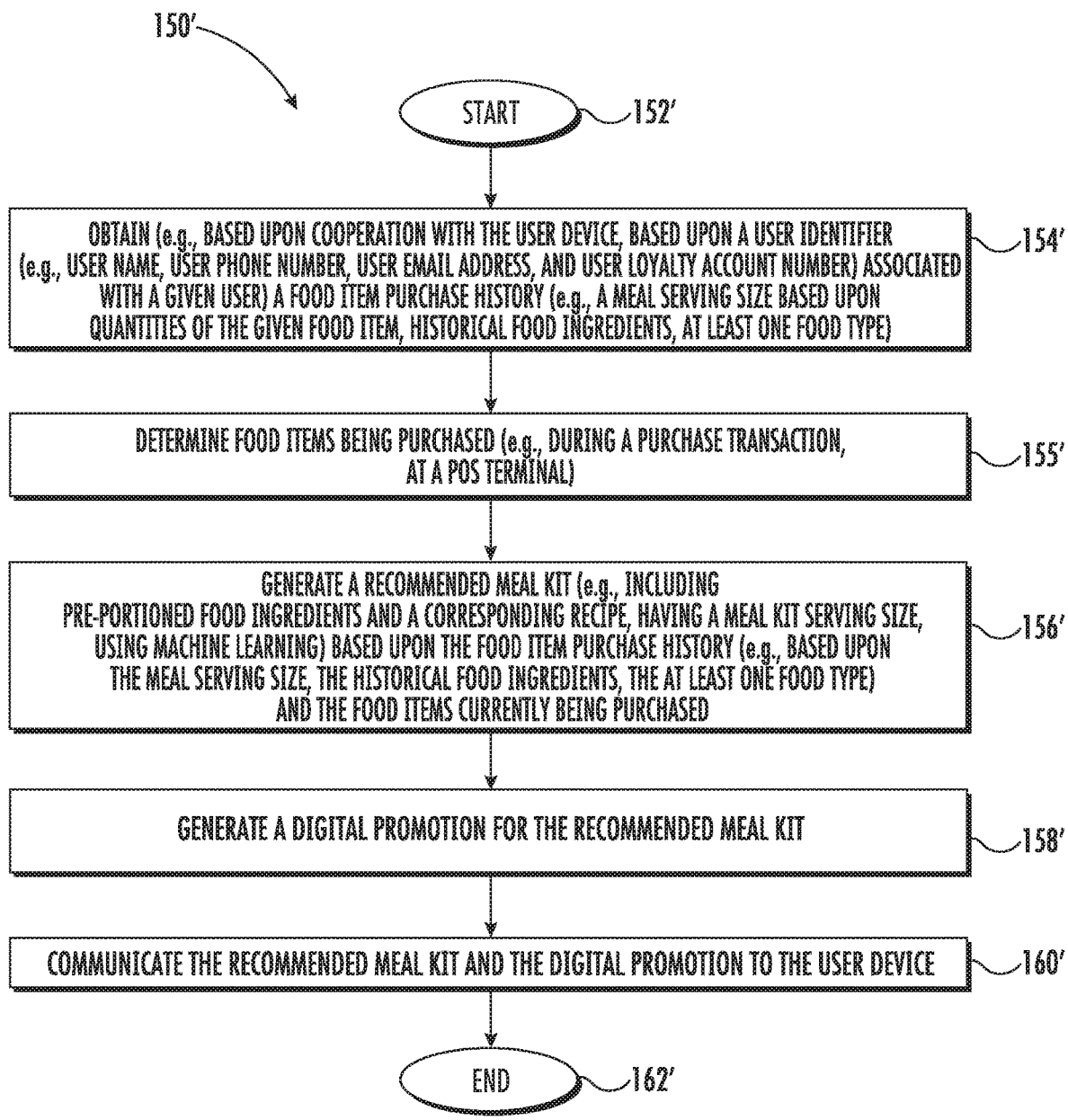
FIG. 12 is a flow chart illustrating operation of the meal kit recommendation server in accordance with an embodiment.
Figure 13:
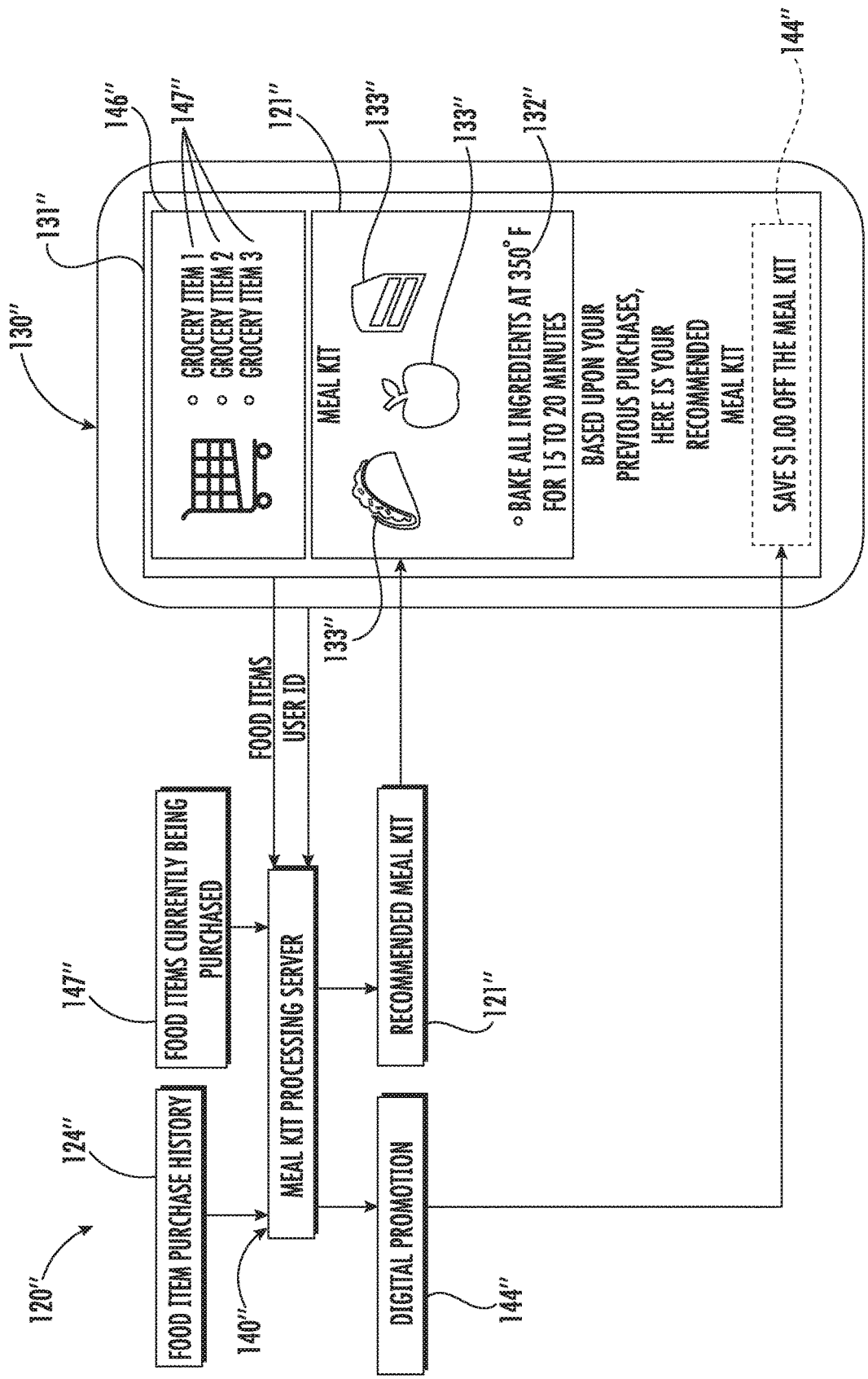
FIG. 13 is a schematic diagram of a system for recommending a meal kit in accordance with another embodiment.

Referring now to FIGS. 10-11 and the flowchart 150' in FIG. 12, beginning at Block 152', in another embodiment, in addition to obtaining a food item purchase history 124' (Block 154'), the meal kit processing server 140' may determine food items 123' being purchased, for example, currently being purchased, during a purchase transaction (Block 155'). The meal kit recommendation server 140' may determine the food items 123' currently being purchased in real-time, for example. Thus, the meal kit recommendation server 140' may generate the recommended meal kit 121' based upon the food item purchase history 124' and the food items 123' being purchased during the purchase transaction (Block 156'). In an embodiment, the system 120' may include a POS terminal 145' that cooperates with the meal kit recommendation server 140' to determine the food items 123' being purchased. Referring briefly to FIG. 13, in another embodiment, the meal kit processing server 140" may, alternatively or additionally, determine the food items 147" currently being purchased during a purchase transaction based upon an electronic shopping cart 146" associated with the user device 130" (i.e., e-commerce site). Elements illustrated, but not specifically described with regard to FIGS. 11 and 13 are similar to elements described above and need not be further described.

Referring again to FIGS. 10-12, the meal kit recommendation server 140' generates a digital promotion 144' for the recommended meal kit 121' (Block 158'), and at Block 160', communicates the recommended meal kit and the digital promotion to the user device 130', for example, as described with respect to the above embodiments. Operations end at Block 162'.

A method aspect is directed to a method of recommending a meal kit 121. The method includes using a meal kit recommendation server 140 to obtain a food item purchase history 124 associated with a given user and generate a recommended meal kit 121 based upon the food item purchase history. The method also includes using the meal kit recommendation server 140 to generate a digital promotion 144 for the recommended meal kit 121 and communicate the recommended meal kit and the digital promotion to a user device 130.

A computer readable medium aspect is directed to a non-transitory computer readable medium for recommending a meal kit 121. The non-transitory computer readable medium includes computer executable instructions that when executed by a processor 141 cause the processor to perform operations. The operations include obtaining a food item purchase history 124 associated with a given user, and generating a recommended meal kit 121 based upon the food item purchase history. The operations also include generating a digital promotion 144 for the recommended meal kit 121, and communicating the recommended meal kit and the digital promotion to a user device 130.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for recommending a meal kit comprising:
a user device associated with a given user; and
a meal kit recommendation server configured to
store a plurality of use-by dates for respective food items for a plurality of store locations,
store a quantity of each of the plurality of food items,
obtain a food item purchase history associated with the given user,
determine a geographic location of the given user based upon the user device,
select a given store location from among the plurality of store locations based upon the determined geographic location,
use machine learning to generate a recommended meal kit for the given store location by training a model with the use-by dates, the quantities, and the food item purchase history,
generate a digital promotion for the recommended meal kit, the digital promotion having a promotional value associated therewith based upon the geographic location of the given user, and
communicate the recommended meal kit and the digital promotion to the user device.

2. The system of claim 1 wherein the recommended meal kit comprises a plurality of pre-portioned food ingredients and a corresponding recipe.

3. The system of claim 1 wherein the meal kit recommendation server is configured to generate the digital promotion to have the promotional value based upon the respective quantities.

4. The system of claim 1 wherein the meal kit recommendation server is configured to generate the digital promotion to have the promotional value based upon the respective use-by dates.

5. A meal kit recommendation server comprising:
a processor and an associated memory configured to
store a plurality of use-by dates for respective food items for a plurality of store locations,
store a quantity of each of the plurality of food items,
obtain a food item purchase history associated with the given user,
determine a geographic location of the given user based upon a user device associated with the given user,
select a given store location from among the plurality of store locations based upon the determined geographic location,
use machine learning to generate a recommended meal kit for the given store location by training a model with the use-by dates, the quantities, and the food item purchase history,
generate a digital promotion for the recommended meal kit, the digital promotion having a promotional value associated therewith based upon the geographic location of the given user, and
communicate the recommended meal kit and the digital promotion to a user device.

6. The meal kit recommendation server of claim 5 wherein the recommended meal kit comprises a plurality of pre-portioned food ingredients and a corresponding recipe.

7. The meal kit recommendation server of claim 5 wherein the processor is configured to generate the digital promotion to have the promotional value based upon the respective quantities.

8. The meal kit recommendation server of claim 5 wherein the processor is configured to generate the digital promotion to have the promotional value based upon the respective use-by dates.

9. A method of recommending a meal kit comprising:
using a meal kit recommendation server to
store a plurality of use-by dates for respective food items for a plurality of store locations,
store a quantity of each of the plurality of food items,
obtain a food item purchase history associated with the given user,
determine a geographic location of the given user based upon a user device associated with the given user,
select a given store location from among the plurality of store locations based upon the determined geographic location,
use machine learning to generate a recommended meal kit for the given store location by training a model with the use-by dates, the quantities, and the food item purchase history,
generate a digital promotion for the recommended meal kit, the digital promotion having a promotional value associated therewith based upon the geographic location of the given user, and
communicate the recommended meal kit and the digital promotion to a user device.

10. The method of claim 9 wherein the recommended meal kit comprises a plurality of pre-portioned food ingredients and a corresponding recipe.

11. The method of claim 9 wherein using the meal kit recommendation server comprises using the meal kit recommendation server to generate the digital promotion to have the promotional value based upon the respective use-by dates.

12. A non-transitory computer readable medium for recommending a meal kit, the non-transitory computer readable medium comprising computer executable instructions that when executed by a processor cause the processor to perform operations comprising:
storing a plurality of use-by dates for respective food items for a plurality of store locations;
storing a quantity of each of the plurality of food items;
obtaining a food item purchase history associated with the given user;
determining a geographic location of the given user based upon a user device associated with the given user;
selecting a given store location from among the plurality of store locations based upon the determined geographic location;
using machine learning to generate a recommended meal kit for the given store location by training a model with the use-by dates, the quantities, and the food item purchase history;
generating a digital promotion for the recommended meal kit, the digital promotion having a promotional value associated therewith based upon the geographic location of the given user; and
communicating the recommended meal kit and the digital promotion to a user device.

13. The non-transitory computer readable medium of claim 12 wherein the recommended meal kit comprises a plurality of pre-portioned food ingredients and a corresponding recipe.

14. The non-transitory computer readable medium of claim 12 wherein the operations comprise generating the digital promotion to have the promotional value based upon the respective use-by dates.

\* \* \* \* \*